United States Patent [19]
de Barros et al.

[11] Patent Number: 5,774,606
[45] Date of Patent: Jun. 30, 1998

[54] OPTICAL FIBER TRANSMISSION SYSTEM WITH A PASSIVE OPTICAL ROUTER

[75] Inventors: Miriam R. de Barros, Scotch Plains; Lars Erik Eskildsen, Fair Haven, both of N.J.; Gerald Nykolak, Long Island, N.Y.

[73] Assignee: Lucent Technologies, Inc., Murray Hill, N.J.

[21] Appl. No.: 649,091

[22] Filed: May 17, 1996

[51] Int. Cl.[6] .................................................. G02B 6/293
[52] U.S. Cl. ........................... 385/24; 359/127; 359/130; 385/37; 385/47
[58] Field of Search .................................. 385/15, 24, 37, 385/41, 42, 46, 47; 359/115, 118, 124, 127, 130

[56] References Cited

U.S. PATENT DOCUMENTS

| | | | |
|---|---|---|---|
| 5,446,809 | 8/1995 | Fritz et al. | 385/24 X |
| 5,488,500 | 1/1996 | Glance | 359/127 |
| 5,579,143 | 11/1996 | Huber | 359/130 |
| 5,608,825 | 3/1997 | Ip | 385/24 |

*Primary Examiner*—John D. Lee

[57] ABSTRACT

In accordance with the invention a multiwavelength optical fiber transmission system is provided with a passive all-fiber optical router for add/drop multiplexing. The passive router is comprised of three fiber components: 1) a fiber directional coupler, 2) a fiber reflective grating filter and 3) a fiber notch filter. The specification describes optical routers from these components ranging in complexity from a three wavelength router to an N-wavelength router.

9 Claims, 6 Drawing Sheets

OPTICAL FIBER TRANSMISSION SYSTEM WITH A PASSIVE OPTICAL ROUTER

FIELD OF THE INVENTION

The present invention relates to optical fiber transmission systems and, in particular, to a multiwavelength optical fiber transmission system having a passive all-fiber optical router for demultiplexing.

BACKGROUND OF THE INVENTION

In a multiwavelength optical fiber transmission system, an optical fiber simultaneously carries many different communications channels in light of respectively different wavelengths. In the use of such systems it is frequently required to add channels onto the fiber and to selectively remove channels from the fiber. Both functions are usually performed at a plurality of locations along the transmission path commonly known as access points or nodes. Channels are added for transmission and removed at the destination.

Such optical routing for add/drop multiplexing is typically accomplished by expensive bulk optical components or integrated planar waveguides. One approach uses bulk diffraction gratings. Incoming wavelengths within a common fiber are spatially separated by a diffraction grating and coupled to separate output fibers. This technique, however, is expensive and requires precise mechanical alignment because of the need to couple from free-space light into optical fibers. The expense and alignment problems increase with the number of wavelength channels.

Another conventional approach uses optical circulators. Multiple wavelengths travel through the circulator to a reflective filter after the circulator output. The filter reflects back a selected wavelength which then appears at one of the circulator ports. However optical circulators are comprised of bulk optical components coupling to and from optical fibers and are very expensive ($5,000.00 each). A separate circulator is required for each demultiplexed wavelength.

A third conventional approach uses small planar waveguide devices, referred to as integrated wavelength routers, which can spatially separate multiple wavelengths into separate output waveguides. However these devices require precise control of the optical pathlength of the waveguides and are expensive. Moreover packaging of the waveguide devices is a major problem which directly affects the stability and reliability of the devices. Accordingly, there is a need for an all-fiber optical router for passive add/drop multiplexing without the use of expensive bulk optical components or integrated planar waveguide devices.

SUMMARY OF THE INVENTION

In accordance with the invention a multiwavelength optical fiber transmission system is provided with a passive all-fiber optical router for add/drop multiplexing. The passive router is comprised of three fiber components: 1) a fiber directional coupler, 2) a fiber reflective grating filter and 3) a fiber notch filter. The specification describes optical routers from these components ranging in complexity from a three wavelength router to an N-wavelength router.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

This description is divided into four parts. Part I describes the three components which make up the inventive optical routers, Part II describes passive all-fiber optical drop routers, and Part III describes passive all-fiber optical routers for add/drop multiplexing (ADMS). Part IV describes transmission systems using ADMs.

I. Components

The inventive transmission system uses three components in a passive all-fiber optical router. The first component is a fiber 2×2 directional coupler. This is a convential device described in detail in "Fiber Optic Networks" by Paul E. Green, ISBN: 0-13-319492-2 1993, Prentice-Hall, which is incorporated herein by reference. It is a two input-two output device wherein light at either input fiber is directed to both of the two output fibers with some split ratio (usually 50%). The two input ports are typically designated 0, 1 and the two output ports are 2, 3. Alternatively, ports 2, 3 can be used for input and ports 0, 1 for output.

The second component is a fiber reflective grating filter. This is a well known device described in *Formation of Bragg Gratings In Optical Fibers By A Transverse Holographic Method*, G. Meltz, et al, "Optics Letters", Vol. 14, No. 15, Aug. 1, 1989, which is incorporated herein by reference. It comprises a length of fiber into which a reflective grating is written. Light which is resonant with the filter center wavelength is reflected backwards. Light at other wavelengths, not resonant with the filter, is transmitted through the grating with substantially no loss. For the resonant wavelength, the reflectivity is substantially 100%.

The third component is a fiber notch filter. The notch filter comes in two versions. In a single wavelength version described in *Long-Period Fiber Gratings As Band-Rejection Filters*, Ashish M. Vengsarkar, et al., "Journal of Lightwave Technology", Vol. 14, No. 1, January, 1996, which is incorporated herein by reference, light at one specific wavelength is extinguished. Light at all other wavelengths is transmitted through the filter with no loss. In a multiwavelength version described in *All-Fiber Wavelength Filter From Successive Biconical Tapers*, Suzanne Lacroix, et al., "Optics Letters", Vol. 11, No. 10, October, 1986, which is incorporated herein by reference, light at multiple wavelengths is attenuated, while light at other wavelengths is transmitted.

II. Passive All-Fiber Optical Drop Routers

Figure 1:
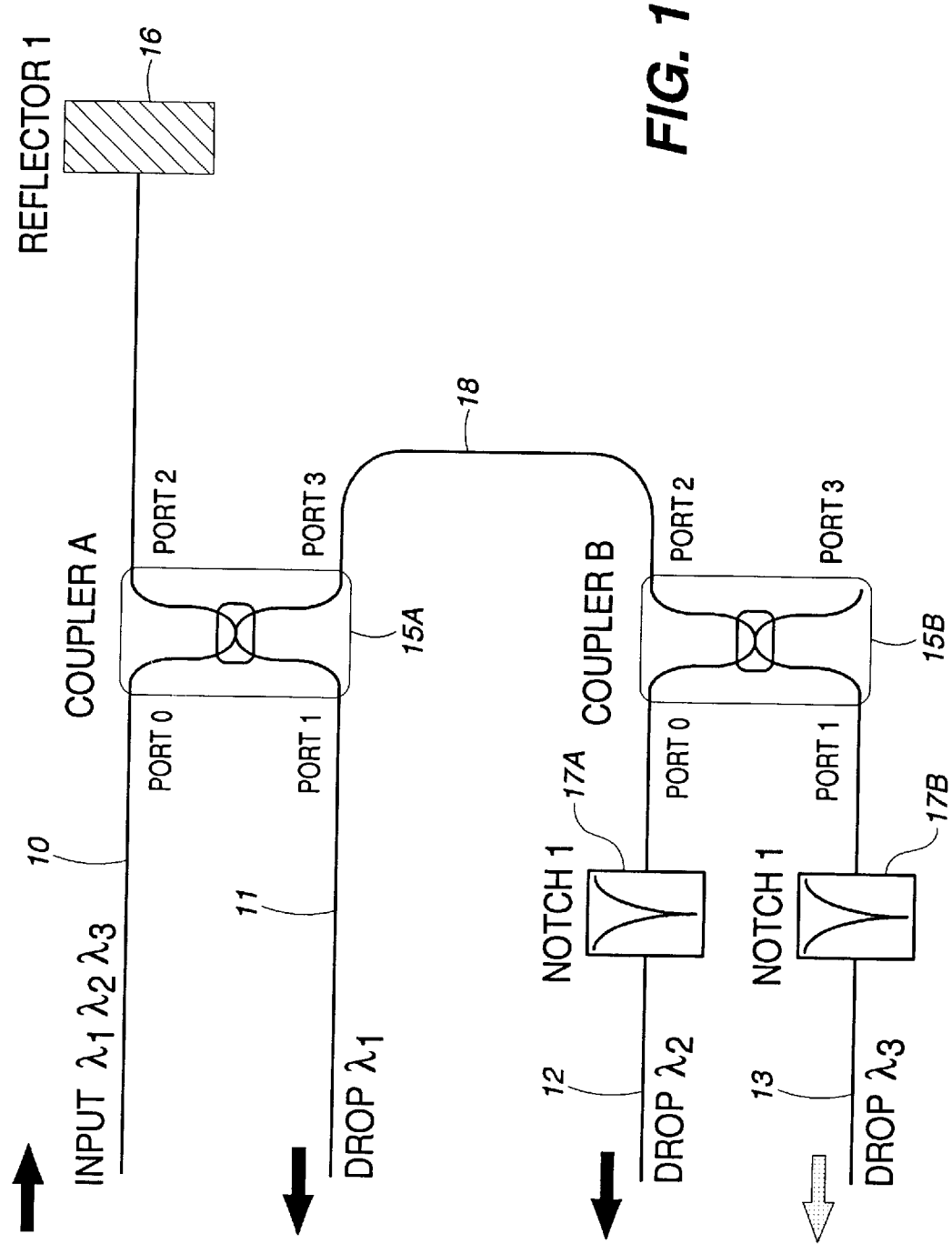
FIG. 1 is a schematic diagram of a three wavelength passive all-fiber optical drop router.

Referring to the drawings, FIG. 1 is a schematic diagram of a three wavelength all-fiber drop router. Three wavelengths $\lambda_1$, $\lambda_2$, $\lambda_3$ present on input fiber 10 are separated onto three different output fibers 11,12,13 respectively. The device is composed of a pair of fiber directional couplers 15A and 15B, a fiber reflecting grating 16 and a pair of fiber notch filters 17A and 17B. Each directional coupler has four ports designated 0 through 3.

Input fiber 10 carrying a three wavelength optical signal is applied to port 0 of coupler 15A. Reflecting grating 16 is applied to port 2 for reflecting $\lambda_1$. Reflected $\lambda_1$ couples to output fiber 11 at port 1. A second coupler 15B is connected to port 3 via fiber 18.

Wavelengths $\lambda_1$, $\lambda_2$, $\lambda_3$ are coupled via fiber 18 to port 2 of coupler 15B, where they are coupled to output ports 0 and 1. Notch filter 17A in output fiber 12 extinguishes $\lambda_1$, $\lambda_2$, leaving $\lambda_2$ as the output. Notch filter 17B in output fiber 13 extinguishes $\lambda_1$, $\lambda_2$, leaving $\lambda_3$ as the output. Each dropped wavelength was split twice by fiber couplers. Thus the insertion loss of any dropped wavelength is 6 dB.

Figure 2:
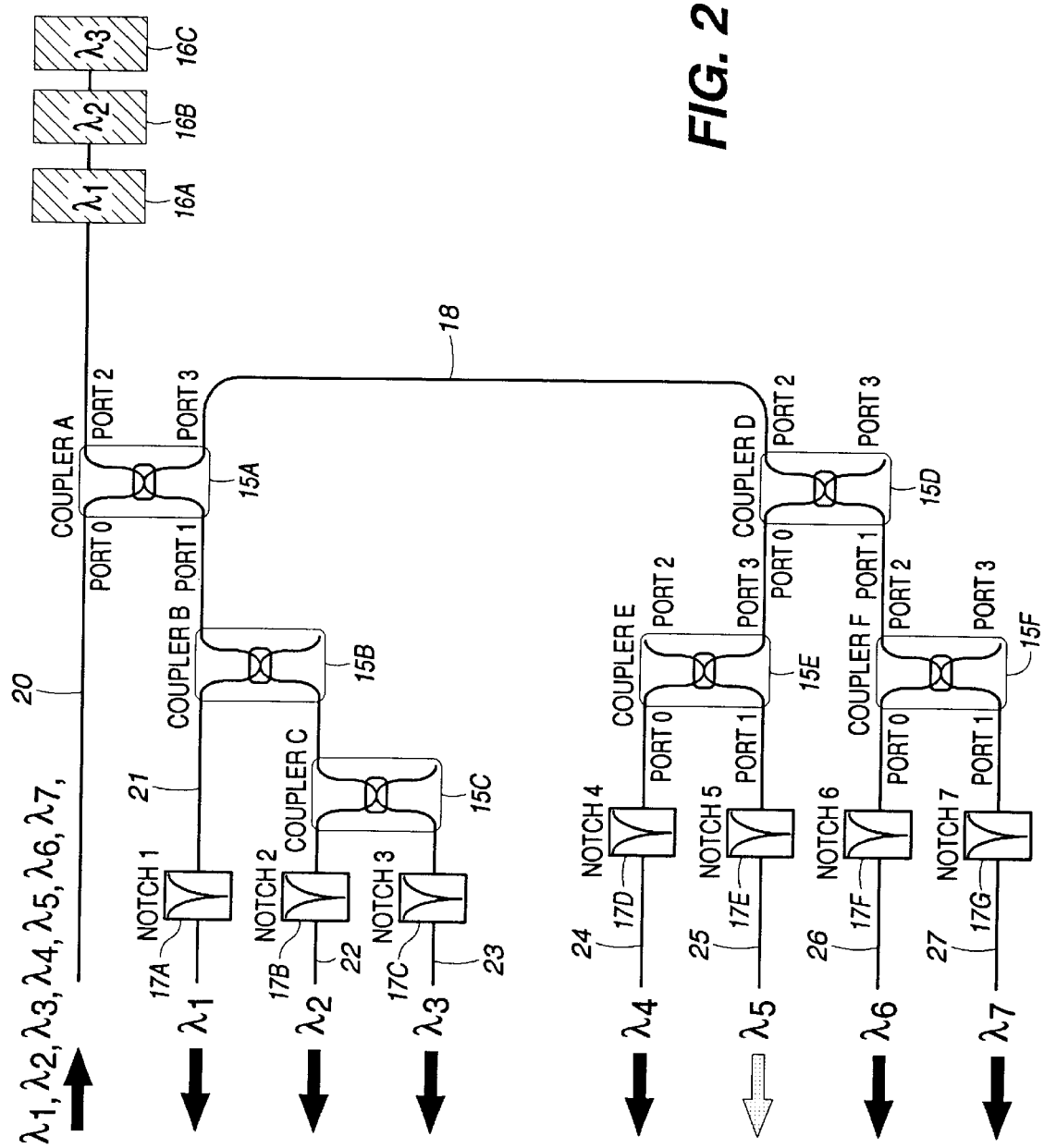
FIG. 2 is similar passive all-fiber optical drop router for seven wavelengths.

The basic router scheme of FIG. 1 can be extended to route more wavelengths. FIG. 2 schematically illustrates a router using the same three fiber components to simultaneously drop 7 different wavelengths to 7 separate fibers. Seven wavelengths $\lambda_1$, $\lambda_2$, $\lambda_3$, $\lambda_4$, $\lambda_5$, $\lambda_6$, $\lambda_7$ present on input fiber 20 are separated onto seven different output fibers 21,22,23,24,25,26,27.

The device comprises six fiber directional couplers 15A, 15B, 15C, 15D, 15E, 15F, three fiber reflecting gratings 16A, 16B, 16C and seven fiber notch filters 17A, 17B, 17C, 17D, 17E, 17F, 17G. Each directional coupler has four ports designated 0 through 3.

Input fiber 20 carrying a 7 wavelength optical signal is applied to port 0 of coupler 15A. Reflecting gratings 16A, 16B and 16C are connected to port 2 for reflecting $\lambda_1$, $\lambda_2$, $\lambda_3$. Reflected $\lambda_1$, $\lambda_2$, $\lambda_3$ couple via port 1 of 15A to port 2 of a second coupler 15B where they are, in turn, coupled to output fiber 21 and port 2 of a third coupler 15C. The signal is split by 15C to output fibers 22 and 23. Notch filters 17A, 17B, 17C eliminate all but $\lambda_1$, $\lambda_2$, and $\lambda_3$, respectively.

Port 3 of coupler 15A provides the split 7 wavelength signal to port 2 of a fourth coupler 15D which, in turn, provides split signals to fifth and sixth couplers 15E and 15F. The four split signals from 15E, 15F are provided to output fibers 24, 25, 26, 27, respectively. Notch filters 17D, 17E, 17F, 17G eliminate all but $\lambda_4$, $\lambda_5$, $\lambda_6$, $\lambda_7$, respectively, on output fibers 24, 25, 26, 27.

This method can be extended indefinitely further to route N different wavelengths to N separate fibers III. Passive All-Fiber Optical Routers For Add/Drop Multiplexing (ADMs)

The all-fiber drop routers described above can be incorporated into routers for add/drop multiplexing which permit multiwavelength dropping and adding as well as permitting the nondropped wavelengths to be transmitted through (i.e. to "continue").

Figure 3:
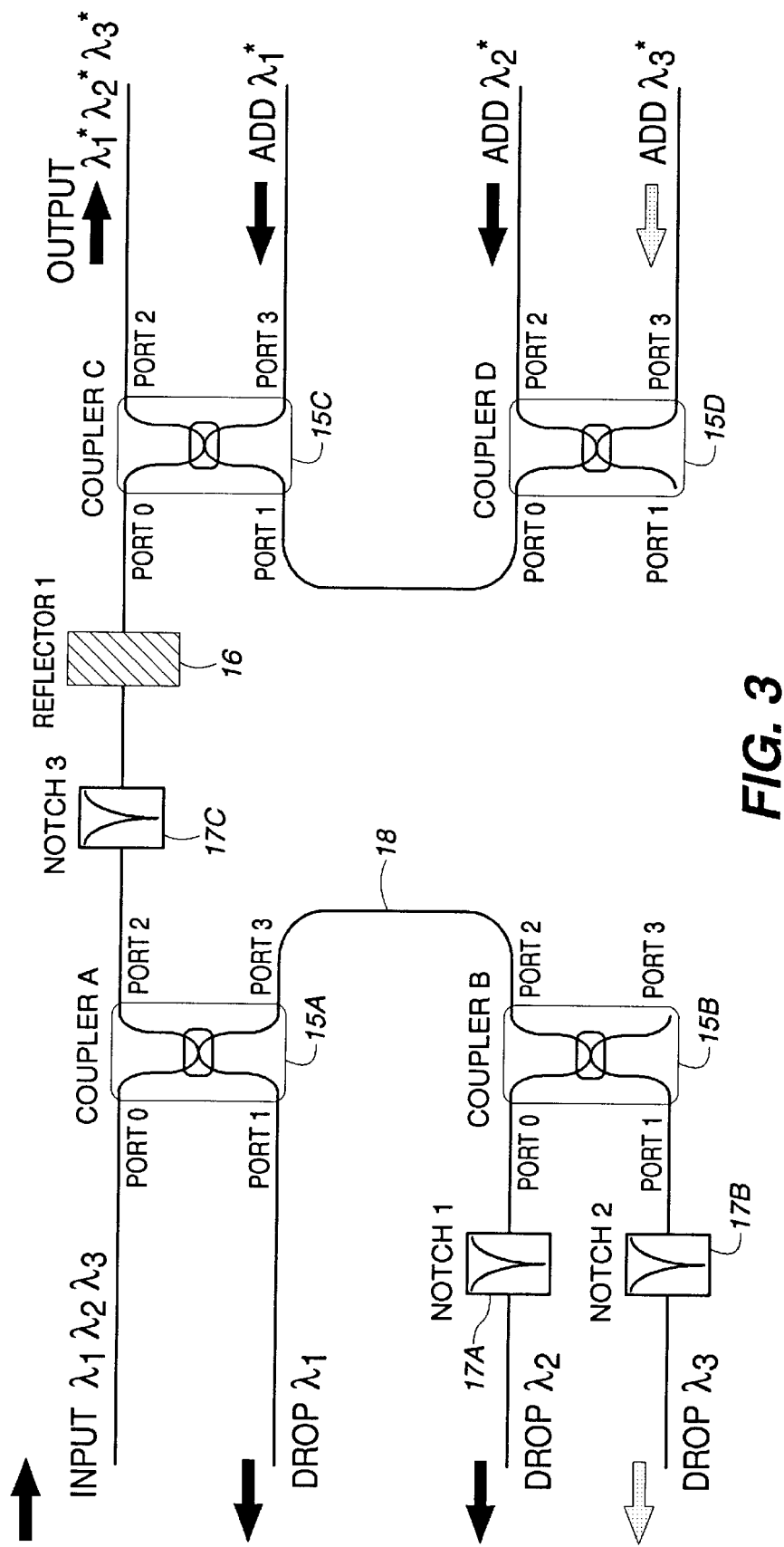
FIG. 3 is a schematic diagram of a three wavelength passive all-fiber optical drop router for add/drop multiplexing.

FIG. 3 schematically illustrates a modification of the FIG. 1 drop router which can perform the add/drop/continue functions. The left half of FIG. 3 is similar to FIG. 1. The components are denoted by the same reference numerals, and they function in the same way to drop three wavelengths.

The add function in the FIG. 3 router is implemented by two additional fiber couplers 15C and 15D and an additional notch filter 17C. For convenience of reference the central wavelengths of the channels to be added are designated $\lambda_1$*, $\lambda_2$ * and $\lambda_3$ *. Port 0 of coupler 15C is connected to reflecting grating 16, and port 0 of coupler 15D is connected to port 1 of coupler 15C. Notch filter 17C is disposed between coupler 15A and reflector 16. The add terminals for $\lambda_1$*, $\lambda_2$*, $\lambda_3$ * are provided by port 3 of coupler 15C, and by ports 2 and 3 of coupler 15d, respectively.

In operation of the add function, wavelength $\lambda_1$ * is coupled into port 3 of coupler 15C, where it appears at port 0 and then is sent to reflecting grating 16. After encountering the reflector, wavelength $\lambda_1$ is sent back to port 0 where it appears at the output, port 2 of coupler 15C. Wavelengths $\lambda_2$*, $\lambda_3$ * are coupled into ports 2 and 3 of coupler 15D, respectively, where they combine and appear on port 0, which is connected to port 1 of coupler 15C. Thus wavelengths $\lambda_2$*, $\lambda_3$ * also appear at the output port 2 of coupler 15C.

In the operation of the continue function, any wavelengths which appear at the input (port 0 of coupler 15A) will flow to the output (port 2 of coupler 15C) unless they are reflected by reflecting grating 16, or attenuated by notch filter 17C. For the add/drop/continue function, it is necessary to insure that the dropped wavelengths do not continue to the output. In this embodiment, notch filter 17C blocks $\lambda_2$, $\lambda_3$ and reflecting grating 16 blocks $\lambda_1$.

The insertion loss per wavelength for either an added channel or a dropped channel is 6–7 dB loss.

Figure 4:
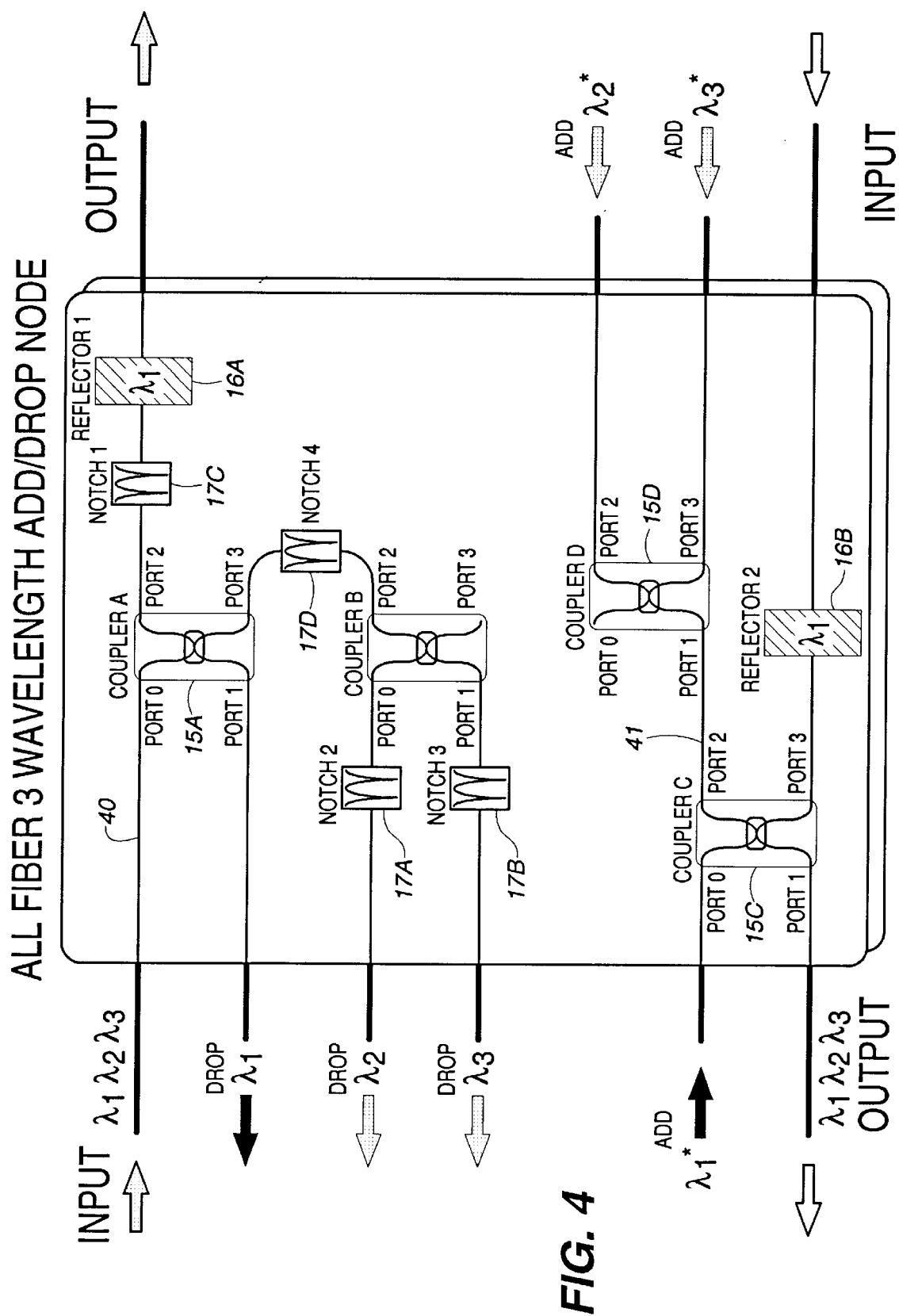
FIG. 4 is a similar three wavelength router for add/drop multiplexing employing a pair of transmission paths.

FIG. 4 illustrates a modified form of the three wavelength add/drop multiplexer of FIG. 3. The FIG. 4 add/drop multiplexer (ADM) is similar to the FIG. 3 embodiment except that the add/drop functions have been physically separated onto two different fibers. The upper half of the FIG. 4 ADM performs the drop function on the upper fiber 40 (going from left to right). The lower half of the ADM performs the add function on the lower fiber 41 (going from right to left).

Figure 5:
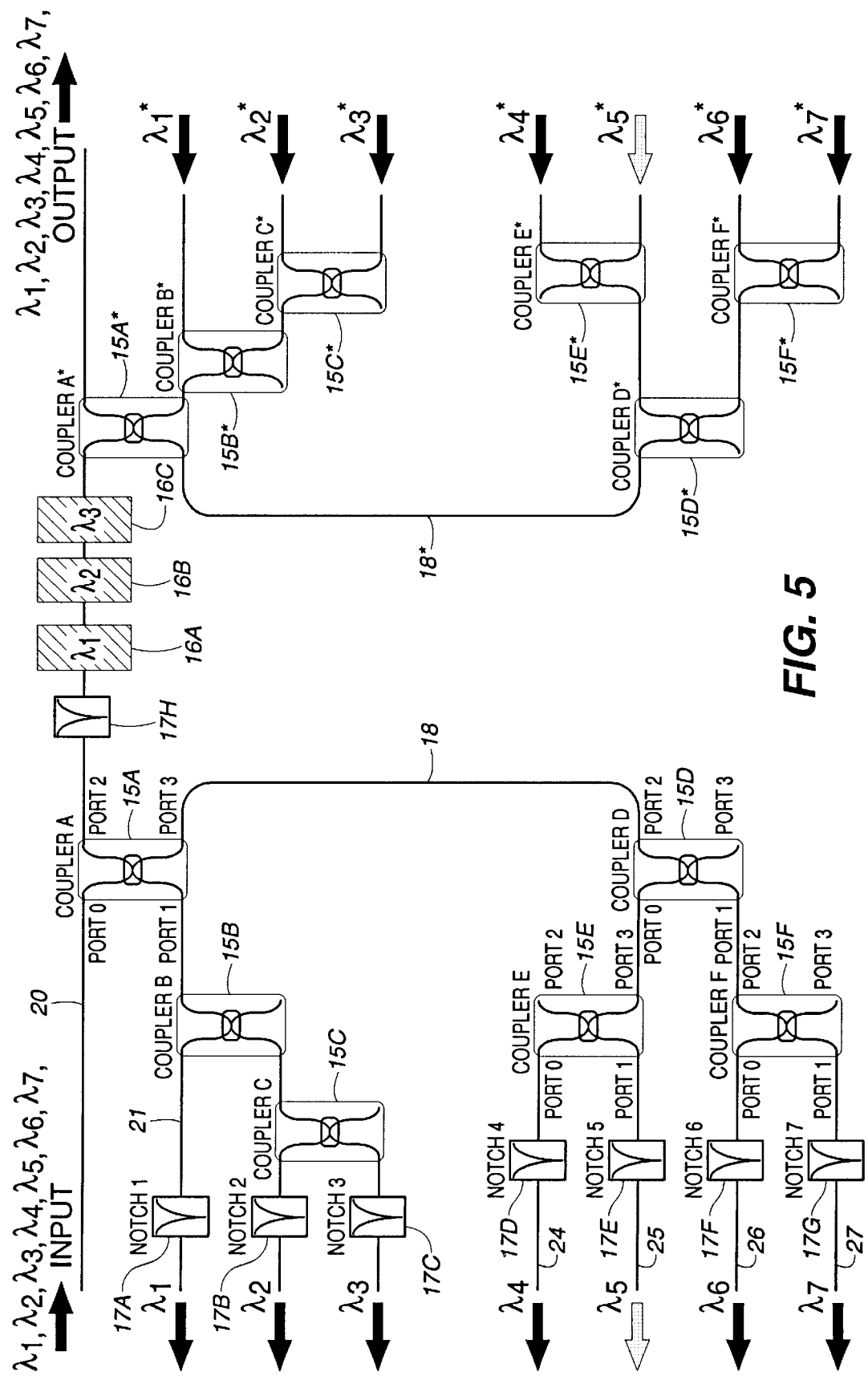
FIG. 5 is a seven wavelength passive all-fiber optical router for add/drop multiplexing.

The approach can be extended to more wavelength channels per node. FIG. 5 schematically illustrates how the 7-drop router of FIG. 2 can be similarly modified to perform the add/drop/continue functions.

IV. Transmission Systems Using Passive ADMs

Figure 6:
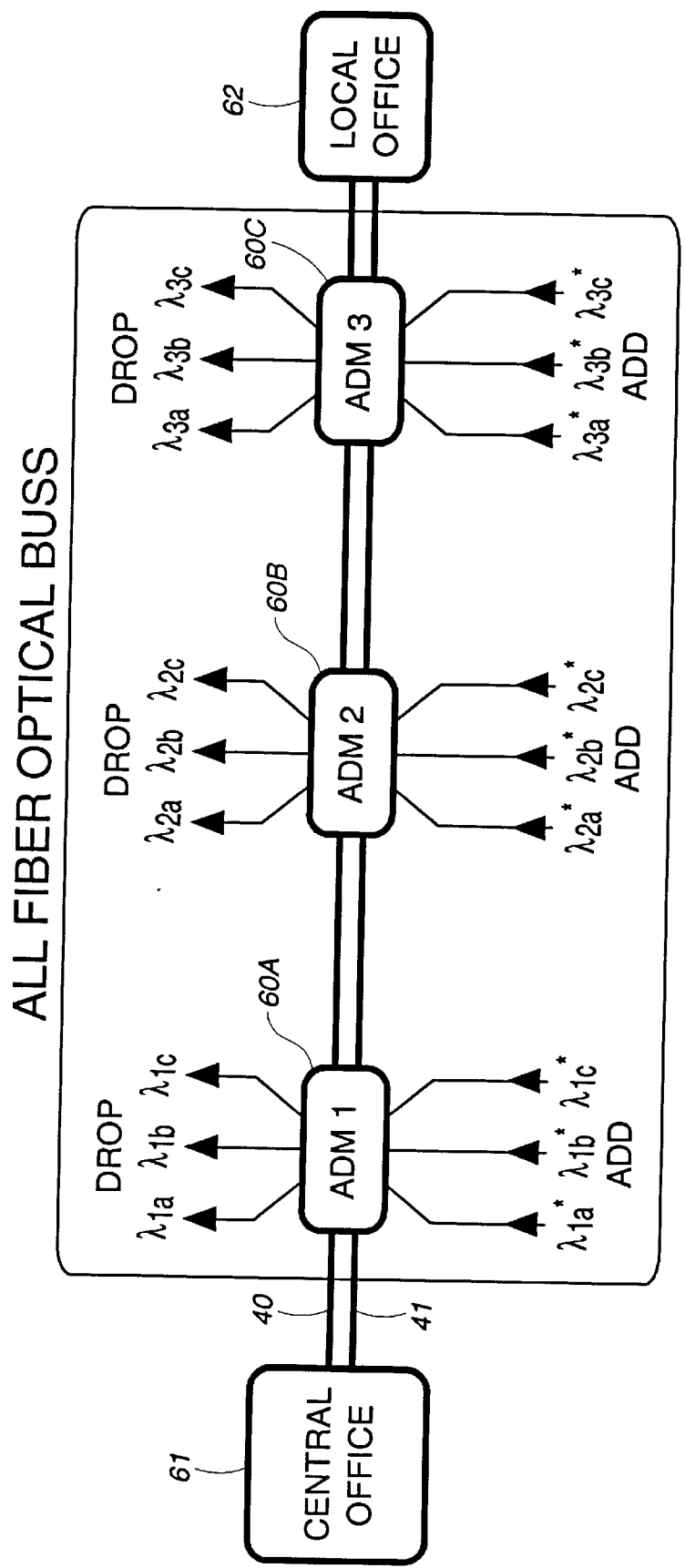
FIG. 6 illustrates how the passive ADMs of FIG. 4 can be used in a practical transmission network.

FIG. 6 illustrates how the passive ADMs of the invention can be used in a practical optical fiber transmission network. Here one or more ADMs of the type shown in FIG. 4 are disposed in series as nodes on a pair of transmission fibers 40 and 41 between a central office 61 and a local office 62. Here each of three ADM nodes in series is designed to add/drop its own unique three wavelengths. For example, ADM 60A add/drops $\lambda_{1a}$, $\lambda_{1b}$, $\lambda_{1c}$ while transmitting the wavelengths associated with ADMs 60B and 60C. ADM 60B adds/drops $\lambda_{2a}$, $\lambda_{2b}$, $\lambda_{2c}$ while transmitting the wavelengths associated with ADM 60C. ADM 60C adds/drops $\lambda_{3a},\lambda_{3b},\lambda_{3c}$.

It is to be understood that the above-described embodiments are illustrative of only a few of the many possible specific embodiments which can represent applications of the invention. Numerous and varied other arrangements can be made by those skilled in the art without departing from the spirit and scope of the invention.

What is claimed:

1. A passive all-fiber optical router capable of dropping at least three optical channels $\lambda_1$, $\lambda_2$, $\lambda_3$ from a multiwavelength input signal comprising:

a first fiber directional coupler having first and second input ports and first and second output ports, said first input port capable of receiving said multiwavelength input signal and coupling it to each of said output ports;

a fiber reflective grating filter for selectively reflecting an optical channel of wavelength $\lambda_1$ optically coupled to said first output port, said reflective grating filter reflecting $\lambda_1$ back into said coupler for selectively presenting $\lambda_1$ at said second input port;

a second fiber directional coupler having first and second input ports and first and second output ports optically coupled to said second output port of said first directional coupler;

a first filter selectively passing an optical channel of a second wavelength $\lambda_2$ optically coupled to said first output port of said second directional coupler, said filter blocking $\lambda_1$ and $\lambda_3$ and selectively presenting $\lambda_2$ at its output; and a second filter selectively passing an optical channel of a third wavelength $\lambda_3$ optically coupled to said second output port of said second directional coupler, said second filter blocking $\lambda_1$ and $\lambda_2$ and selectively presenting $\lambda_3$ at its output.

2. A passive all-fiber optical router capable of dropping a plurality of optical channels from a multiwavelength input signal comprising:

a first directional coupler having first and second input ports and first and second output ports, said multiwavelength input signal applied to said first input port and coupled to each of said output ports;

a plurality of fiber reflective grating filters coupled to said first output port of said first coupler for selectively reflecting a respective plurality of optical channels of wavelengths to be dropped back into said first coupler for presentation at said second input port;

a first network of couplers and filters coupled to said second input port of said first coupler for receiving said plurality of channels to be dropped and presenting them as separate channels;

a second network of couplers and filters coupled to said second output port of said first coupler for receiving the signal from said output port and presenting any channels therein to be dropped as separate channels.

3. A passive all-fiber add/drop multiplexer comprising an all-fiber optical router according to claim 1 or 2 optically coupled with an optical multiplexer for adding one or more optical channels.

4. An optical fiber transmission system comprising a pair of optical transmission fibers including one or more add/drop nodes, at least one of said add/drop nodes comprising on one of said transmission fibers an all-fiber optical router according to claim 1 or 2.

5. A passive all-fiber optical multiplexer capable of adding at least one optical channel of wavelength $\lambda_1^*$ to a multiwavelength signal comprising:

a first fiber directional coupler having first and second input ports and first and second output ports, said first input port capable of receiving said multiwavelength signal and coupling it to said first output port, and said second output port of said directional coupler capable of receiving said channel of wavelength $\lambda_1^*$; and a first fiber reflective grating coupled to said first input port of said coupler for reflecting $\lambda_1^*$ back into said coupler for presentation at said first output port of said multiwavelength signal with the $\lambda_1^*$ channel added.

6. A passive all fiber optical multiplexer according to claim 5 capable of adding at least optical channels $\lambda_1^*$, $\lambda_2^*$, $\lambda_3^*$, said multiplexer further comprising:

a second directional coupler having first and second input ports and first and second output ports, said second coupler capable of receiving at said first input port a second channel of wavelength $\lambda_2^*$ to be added and at said second input port a third channel of wavelength $\lambda_3^*$ to be added, said second coupler presenting the combined $\lambda_2^*$ and $\lambda_3^*$ channels at said first output port; and said first output port of said second coupler optically coupled to said second input port of said first coupler for adding channels $\lambda_2^*$ and $\lambda_3^*$ to said multiwavelength signal.

7. A passive all-fiber optical multiplexer capable of adding a plurality of optical channels to a multiwavelength signal comprising:

a first directional coupler having first and second input ports and first and second output ports, said first input port capable of receiving said multiwavelength signal;

a plurality of fiber reflective grating filters for selectively reflecting a respective plurality of optical channels of wavelengths to be added back into said coupler for presentation at said first output port;

a first network of couplers coupled to said second output port of said first directional coupler for receiving said plurality of optical channels to be added and presenting them as a combined signal at said second output port of said first coupler; and a second network of couplers coupled to said second input port of said first directional coupler for receiving a second plurality of separate channels to be added and presenting them as a combined signal at said second input port of said first coupler.

8. A passive all-fiber optical add/drop multiplexer comprising an all-fiber optical multiplexer according to claim 5 or 6 or 7 optically coupled with an optical router for dropping one or more optical channels from said multiwavelength signal.

9. An optical fiber transmission system comprising a pair of optical transmission fibers including one or more add/drop nodes, at least one of said add/drop nodes comprising on one of said transmission fibers an all-fiber optical multiplexer according to claim 5 or 6 or 7.

* * * * *